United States Patent [19]
Choi

[11] Patent Number: 5,753,153
[45] Date of Patent: May 19, 1998

[54] METHOD FOR MOLD CLAMPING UNITS

[75] Inventor: Christopher W. M. Choi, Richmond Hill, Canada

[73] Assignee: Husky Injection Molding Systems Ltd., Canada

[21] Appl. No.: 582,434

[22] Filed: Jan. 2, 1996

[51] Int. Cl.[6] .................................................. B29C 45/64
[52] U.S. Cl. .................... 264/40.5; 264/328.1; 425/149; 425/150; 425/595; 425/451.9
[58] Field of Search ............................... 264/40.1, 40.5, 264/297.2, 328.1, 328.8; 425/136–138, 149, 150, 589, 595, 450.1, 451.9

[56] References Cited

U.S. PATENT DOCUMENTS

| | | |
|---|---|---|
| 2,976,569 | 3/1961 | Quere et al. . |
| 4,106,885 | 8/1978 | Poncet ................................. 425/595 |
| 4,304,540 | 12/1981 | Hammon ............................. 425/595 |
| 4,504,208 | 3/1985 | Kurumaji et al. .................... 425/595 |
| 4,832,884 | 5/1989 | Speck et al. . |
| 4,874,309 | 10/1989 | Kushibe et al. ..................... 425/595 |
| 4,966,738 | 10/1990 | Inaba et al. . |
| 5,135,385 | 8/1992 | Fukuzawa et al. .................. 425/595 |
| 5,147,661 | 9/1992 | Kurumaji et al. . |
| 5,338,171 | 8/1994 | Hayakawa et al. . |
| 5,370,518 | 12/1994 | Sasaki et al. . |
| 5,417,913 | 5/1995 | Arend . |
| 5,620,723 | 4/1997 | Glaesener et al. .................. 425/595 |

FOREIGN PATENT DOCUMENTS

| | | |
|---|---|---|
| 0438721 | 7/1991 | European Pat. Off. . |
| 2390271 | 12/1978 | France . |
| 61-261017 | 11/1986 | Japan . |
| 2064415 | 6/1981 | United Kingdom . |
| 9508428 | 3/1995 | WIPO . |

*Primary Examiner*—Jill L. Heitbrink
*Attorney, Agent, or Firm*—Bachman & LaPointe, P.C.

[57] ABSTRACT

A system and process for controlling mold activity of a molding machine is disclosed and includes a clamping device for positioning a movable mold platen on a carrier device and relative another platen, for forcefully engaging the movable mold platen with the another platen and on the carrier device, for sustaining forceful engagement of the movable mold platen with the another platen and the carrier device, and for breaking the movable platen from the another platen and the carrying device. The movable mold platen includes a movable mold half and the another platen includes another mold half. The system also includes a manner for determining an adjustable starting position of the clamping device and movable mold platen. A manner for adjusting the adjustable starting position for achieving greater accuracy of the adjustable starting position for the clamping device and the movable platen is provided. The manner for adjusting includes a mechanism for actuating the clamping device. A device for monitoring and controlling the position of the clamping device and movable platen is provided as well as a mechanism for sustaining the clamp-up force at a prescribed level.

25 Claims, 9 Drawing Sheets

METHOD FOR MOLD CLAMPING UNITS

BACKGROUND OF THE INVENTION

This invention is directed to injection molding machines using tie bar clamping units, and more particularly, to a control system for controlling the clamp-up and mold break operations of the tie bar clamping units.

The prior art includes many injection molding machines which use tie bar clamping units for positioning a platen for the application of clamp-up forces. Control systems using hydraulic fluid, pressurized air and electric motors in combination with numerous switches and typically a controller unit are used to control both the positioning of the platens and the application and removal of clamp-up force for acquiring mold clamp-up and mold break.

Japanese Patent 61261-017 discloses a clamping mechanism for injection molding machines. The purpose of the control system therein is to maintain a parallel parting line between the molds by sensing the distance traveled by each clamping cylinder of each tie bar and maintaining the distances substantially equal. Accordingly, parallelism of the parting line between the molds can be maintained when the injection pressure of molten resin is uneven within the mold.

U.S. Pat. No. 4,832,884 to Speck et al. discloses a method for measuring and controlling the closing force of a plastic injection molding machine. Accordingly, for an injection molding machine, a closing force is measured for a predetermined number of operation cycles. A mean value is calculated from the measurements and if the mean value is within a predetermined tolerance, no control intervention takes place. However, if the mean value is outside the tolerance but within a zone limited by alarm units, control intervention takes place by stepwise changing the installed height of the mold until the actual value measured for closing force after each operating cycle is within the tolerance given. In this method and system, a toggle joint system serves to generate the closing force on the first and second mold parts. In this case, the force is measured and if the force is within a tolerance zone, the spacing between the first and second mold parts is altered to less than or no increase relative the old force.

U.S. Pat. No. 4,966,738 to Inaba et al. discloses a method for mold clamping force adjustment. Accordingly, in this method, a mold touch position is detected, at which the mold halves of a mold contact each other. The mold temperature is detected by means of thermocouples attached to the mold halves. The mold thickness is obtained based on the position where a movable platen and a stationary platen of the injection molding machine contact each other. After a molding operation is started, the mold temperature is detected and the amount of change in mold thickness during a period between a preceding cycle and a current cycle is calculated based on the change of mold temperature, the mold thickness, and the thermal expansion coefficient of the mold. A mold touch position for a current cycle is obtained based on the calculated value. Accordingly, when the mold is clamped in the current cycle, the movable platen is moved from the mold touch position toward the stationary platen by a predetermined amount to produce a predetermined mold clamping force. For this method, the measurements and adjustments are directed primarily to the mold position and not to the position of the clamping units. A clamping unit is a singular one which functions to force the movable platen against the stationary platen. That is, no tie bar clamping units are used internal to any of the platens for producing the clamp-up force.

U.S. Pat. No. 5,147,661 to Kurumaji et al. discloses a mold aligning device for a compression molding machine. The mold aligning device includes a plurality of mold position adjusting cylinder actuators disposed on a bed wherein position detectors are associated with the mold positioning adjusting cylinder actuators to detect the strokes thereof. The hydraulic source for driving the mold position adjusting cylinder actuators and control unit for controlling the strokes of the piston rods of the actuators with reference to zero points of the piston rods of the actuators, is determined beforehand. The zero points are decided by placing the upper mold in close contact with the lower mold and extending the piston rods of the actuators so that the piston rods are pressed against the lower surface of a slide block. The strokes of the piston rods are controlled during a compression-molding operation so that the upper mold is maintained precisely in parallel with the lower mold. This device is directed to pressure molding. The cylinder actuators are not positioned within a movable molten platen, and the actuators do not clamp onto tie bars. The main purpose of the machine is to maintain parallelism between the upper and lower molds by the actuators placing direct pressure on the upper mold supporting surface for maintaining the same parallel to the lower mold.

U.S. Pat. No. 5,338,171 to Hayakawa et al. discloses a die-clamping apparatus with an aligning device. The apparatus includes a stationary die plate for holding a stationary die, a movable die plate for holding a movable die, a hydraulic cylinder for moving the movable die plate forwardly and rearwardly with respect to the stationary die plate, and a tie bar for clamping by a fastening device located in the movable die plate. One or more alignment devices are provided so as to join the movable die and the stationary die in such a manner that primary alignment can be performed. The molding apparatus can be provided with a guide pin for secondarily aligning the movable die with respect to the stationary die when the stationary die and the movable die have been placed at predetermined positions. Four die clamping cylinders are provided at the corners of the stationary die plate so as to apply a clamping force to the stationary and movable dies after the fastening device has fastened to the tie bar. For this device, the tie bar fastener and clamping units, while being located on the tie bars, one adjacent the movable platen and one adjacent the stationary platen, are separate devices adding to the complexity of the machine.

U.S. Pat. No. 5,370,518 to Sasaki et al. discloses an apparatus for injection and compression molding. The apparatus includes an injection device and a compression molding device wherein the compression molding device includes a stationary die plate for holding a stationary die, a movable die plate for holding a movable die, means for rapidly extending and retracting the movable die plate relative to the stationary die plate and means for locking the movable die plate to the tie bars at a position where the movable die plate approaches the stationary die plate. Means for fastening the dies after the movable die plate is locked to the tie bars is also provided. An injection device for feeding a molten plastic material into a mold cavity between the stationary die and the movable die initiates feeding of the molten plastic material into the mold cavity when the stationary die and movable die are parted from each other by a predetermined distance. The plastic material is compressed and drawn while the movable die is moved towards the stationary die after a predetermined quantity of molten plastic material has been fed into the mold cavity. The apparatus includes a device in a movable die plate for clamping onto the tie bars. However, the device does not include a combined means for providing the clamping force between the platens and fastening to the tie bars, as the clamp force is provided by separate die fastening cylinders which are positioned on the tie bars but separate from the fasteners.

There exists, based on the shortcomings of the devices discussed above, a need for a control system and process for controlling tie bar clamping mechanisms which function to engage tie bars, provide a mold clamp-up force and a mold break force, and a control system which is operative with tie bar clamping mechanisms for consistently setting adjustable starting positions for the tie bar clamping mechanisms at which the necessary stroke for sufficient mold clamp-up and mold break force is provided.

SUMMARY OF THE INVENTION

The primary object of this invention is to provide a control system for use in controlling tie bar clamping mechanisms for injection molding machines.

Another object of this invention is to provide a control system for use with tie bar clamping mechanisms for an injection molding machine, which tie bar mechanisms function to engage tie bars, provide clamp-up forces, and also to provide mold break forces.

Still another object of this invention is to provide a control system and process which is operative with tie bar clamping mechanisms for placing the same in the proper adjustable starting position after each molding operation so as to consistently allow for sufficient stroke for mold clamp-up and mold break.

Yet another object of this invention is to provide a control system and process which is operative with tie bar clamping mechanisms for adjusting starting positions of the mechanisms for accommodating different size molds and respective shut heights.

The objects and advantages disclosed herein are achieved by the system and process of the present invention for controlling mold activity of a molding machine. The system comprises clamping means for positioning a movable mold platen relative a fixed platen, for forcefully engaging said movable mold platen with said fixed platen, for sustaining forceful engagement of said movable mold platen with said fixed platen, and for breaking said movable platen from said fixed platen, said movable mold platen including a movable mold half and said fixed platen including another mold half; means for determining an adjustable starting position of said clamping means and movable mold platen, wherein said adjustable starting position provides sufficient stroke to said movable mold platen for mold clamp-up and mold break; means for adjusting said adjustable starting position for achieving greater accuracy of said adjustable starting position for said clamping means and said movable platen, said means for adjusting including means for actuating said clamping means for developing said clamp-up force of said clamping means; means for monitoring and controlling the position of said clamping means and movable platen; and means for sustaining said clamp-up force at a prescribed level between said movable mold platen and said fixed platen.

The details of the present invention are set out in the following description and drawings wherein like reference characters depict like elements.

DETAILED DESCRIPTION OF THE PREFERRED EMBODIMENT

Figure 1:
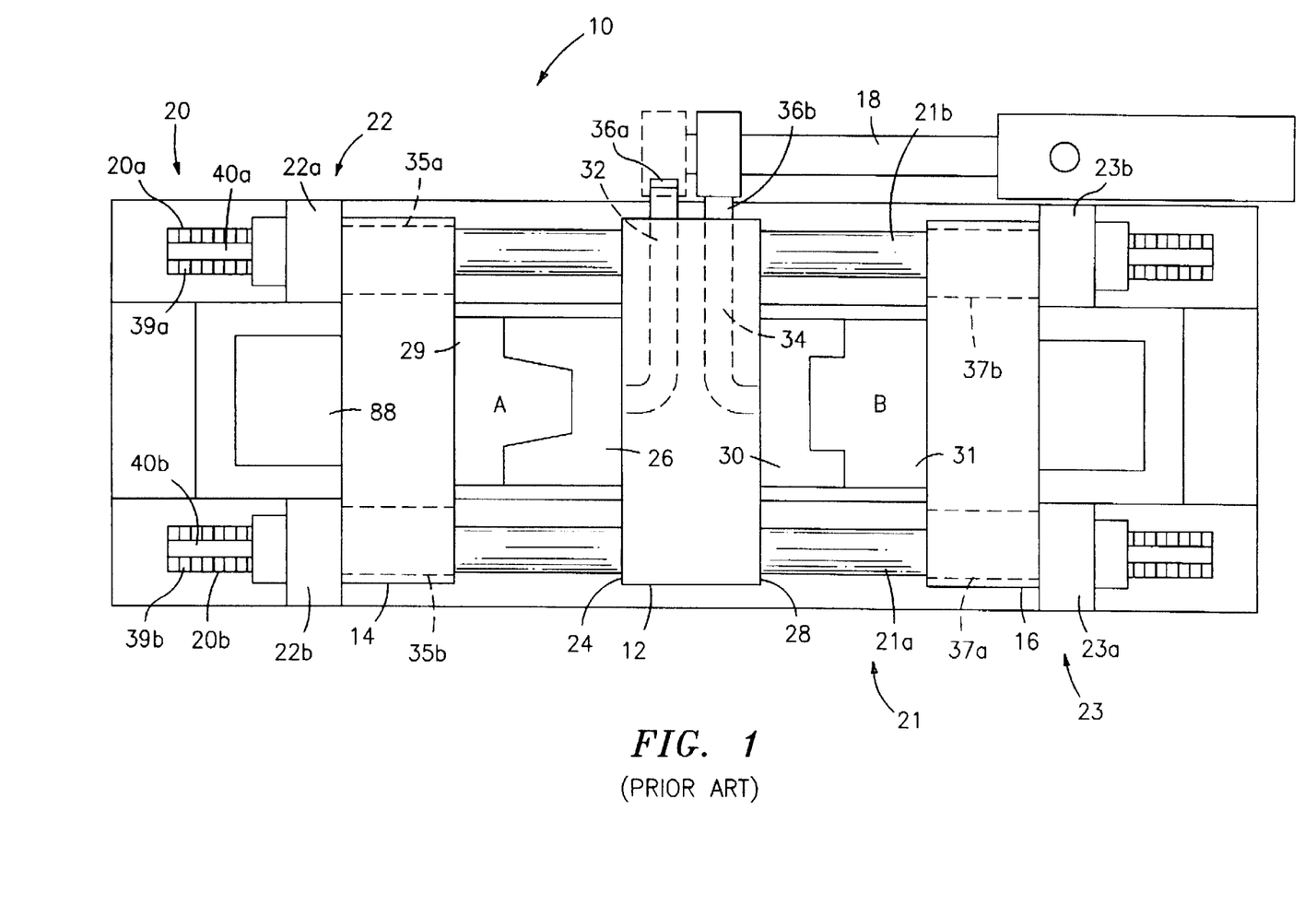
FIG. 1 is a simplified overhead view of a prior art tandem injection molding machine having securing/clamping assemblies which is used with the present invention.

Referring now to the drawings in detail, there is shown in FIG. 1, a simplified top view of a prior art tandem injection molding machine which is used with the present invention and is designated generally as 10. Machine 10 generally includes a fixed center platen 12, a movable end platen 14, a movable end platen 16, an injection unit 18, tie bars 20 and 21 for guiding the movable platens and securing/clamping assemblies 22 and 23.

Figure 2:
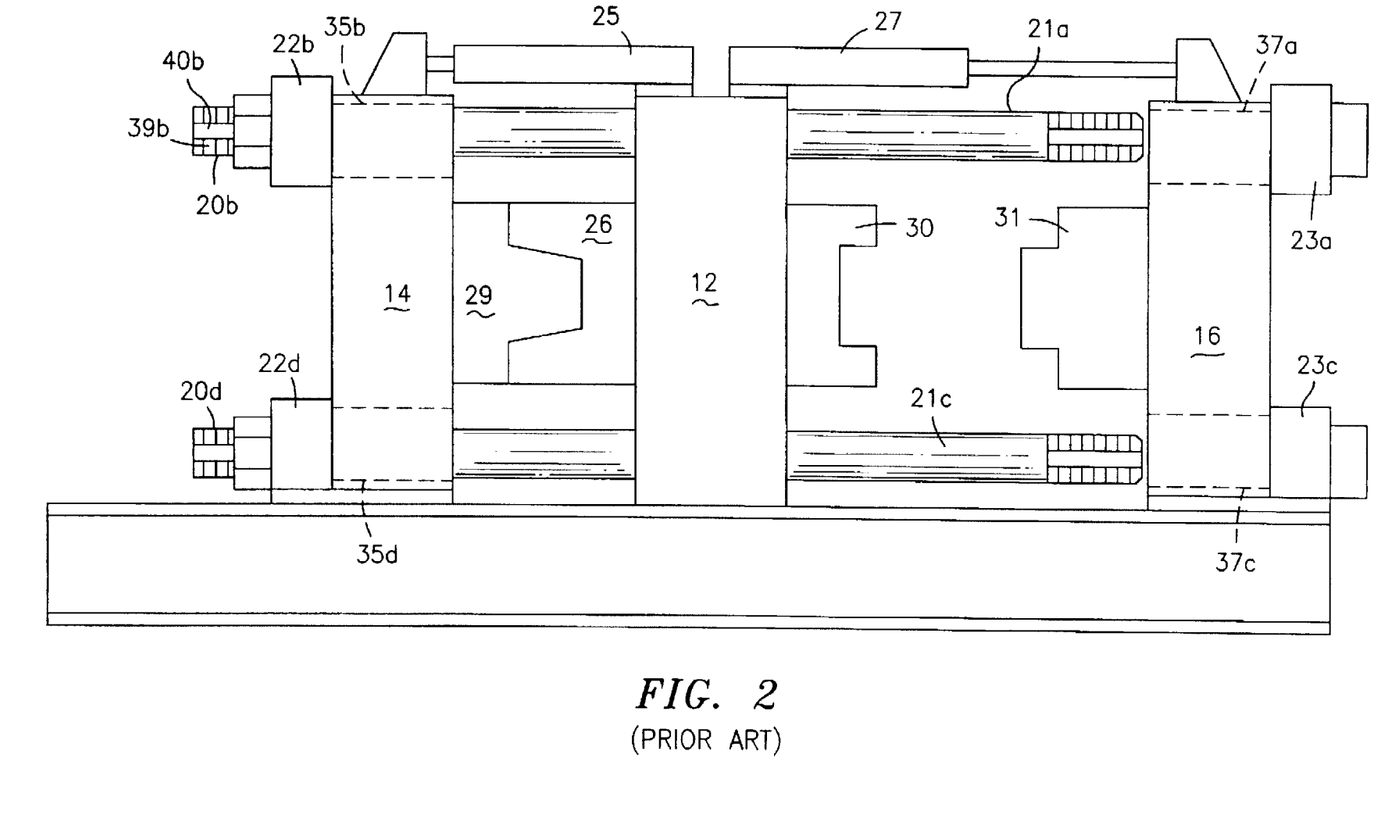
FIG. 2 is an elevational view of the tandem injection molding machine shown in FIG. 1.

In this prior art embodiment, center platen 12 is fixed to a base and movable end platens 14 and 16 are movable away from and toward center platen 12 via positioning cylinders 25 and 27, respectively, as shown in FIG. 2. Center platen 12 includes a molding side 24 having a first stationary mold half 26 and a molding side 28 including a second stationary mold half 30. In addition, center stationary platen 12 includes a first hot runner 32 for directing melt to first stationary mold half 26 and a second hot runner 34 for directing melt to the second stationary mold half 30. Locking flanges 36a and 36b extend from the side of the fixed center platen for alternating engagement with injection unit 18. Alternatively, a single fixed connection could be used with a distribution valve to feed resin to either side of the center platen and respective mold. Movable platens 14 and 16 each include a movable mold half 29 and 31, respectively, for forming molds upon closing with stationary mold halves 26 and 30, respectively.

Referring to FIG. 1, and FIG. 2 showing an elevational view of machine 10 shown in FIG. 1, tie bars 20a–20d (20c not shown) extend from fixed center platen 12 toward movable end platen 14 and four tie bars 21a–21d (21d not shown) extend from fixed center platen 12 toward movable end platen 16. Tie bars 20a–20d and 21a–21d are arranged at the corners of the fixed center platen 12 such that when the mold is closed, they extend through securing/clamping assemblies 22a–22d (22c not shown) and 23a–23d (23d not shown), respectively, carried by, or within the movable end platens 14 and 16, respectively. The tie bars are preferably stationary while the movable platens move relative thereto.

Each of end platens 14 and 16 include four bores shown by dotted lines in FIGS. 1 and 2, 35a–35d (35c not shown) and 37a–37d (37d not shown), respectively, in which clamping and securing assemblies 22a–22d and 23a–23d, respectively, extend. Movable platen 14 and 16 preferably include fasteners, shown in FIG. 4, on the outwardly facing surface thereof for the securement of the securing/clamping assemblies, respectively.

The securing/clamping assemblies function to both grip or engage the tie bars and apply pressure to the mold halves during mold injection. Accordingly, from a general standpoint, each of the securing/clamping assemblies 22a–22d and 23a–23d include a mechanism for securely and positively engaging the tie bar, wherein the mechanism is further capable of conveying pressure to the platens for forcing the mold halves together during injection molding. Preferably, each securing/clamping assembly is formed from a body member having a structure which is movable as a single unit for securing with the tie bars and applying clamping pressure between the platens.

All of the securing/clamping assemblies, bores, and the tie bars are substantially the same and accordingly, only one securing/clamping assembly 22a, bore 35a and tie bar 20a are described in detail along with their associated elements, it being understood that the description applies equally to all securing/clamping assemblies, bores and tie bars and associated elements.

Figure 3A:
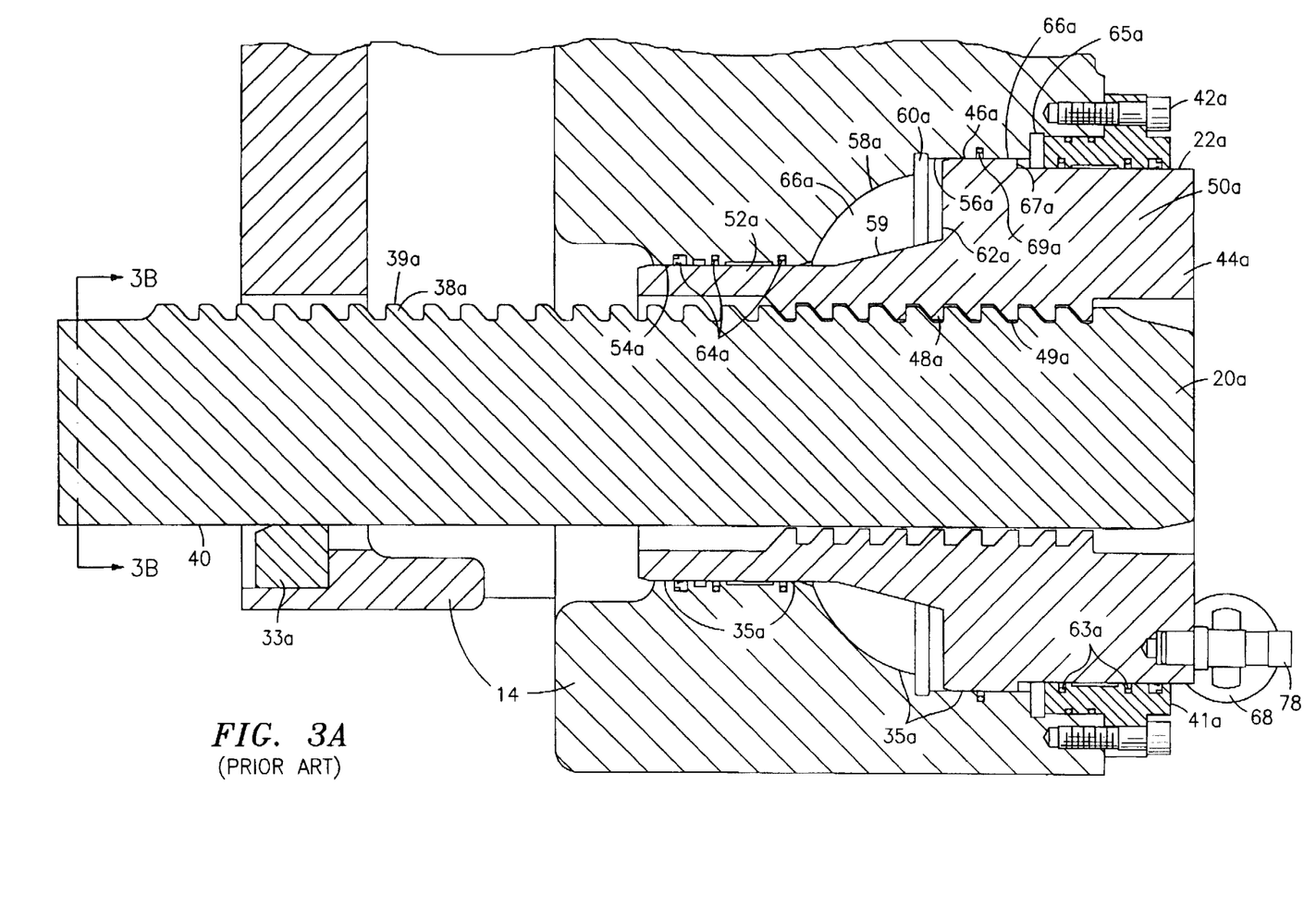
FIGS. 3A and 3B are detailed cross-sectional and end views of securing/clamping assemblies for use with the principles of the present invention.
Figure 3B:
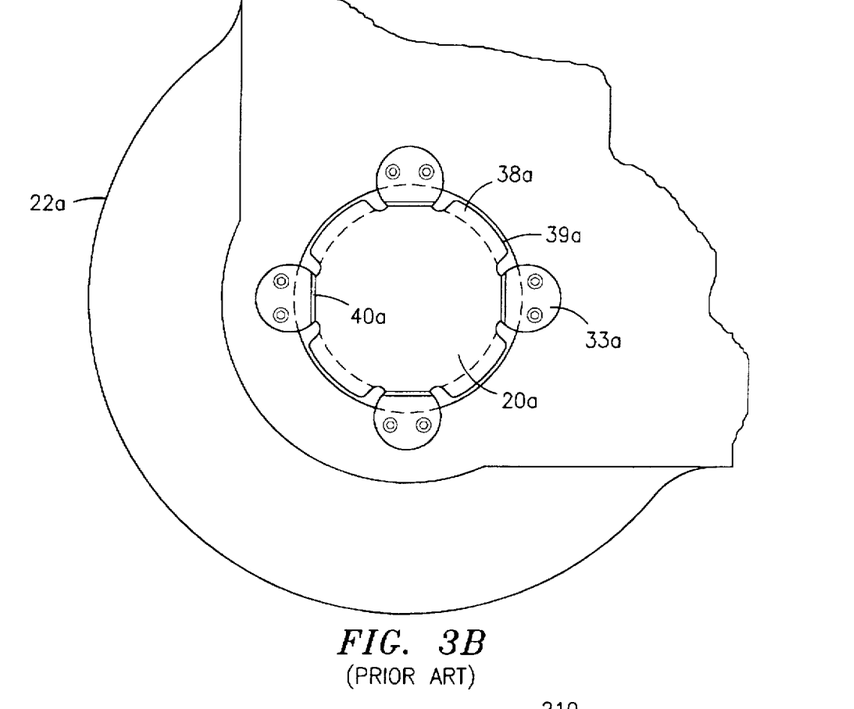

In a particular embodiment of the securing/clamping assemblies, securing/clamping assembly 22a is mounted on the outwardly facing side of movable end platen 14 and within bore 35a as shown in FIG. 1, and as discussed above. Referring to FIGS. 3A and 3B, in order for the securing/clamping assembly 22a of platen 14 to function with tie bar 20a, tie bar 20a includes an elongated end section having a plurality of spaced protrusions in the form of teeth 38a separated by longitudinally extending inner slots 40a, as shown in FIG. 3B. Accordingly, at the end of tie bar 20a is a toothed outer surface, as shown in FIG. 3A. The toothed outer surface of tie bar 20a is in the form of longitudinal outer strips of teeth 39a extending in the axial direction of the tie bar, wherein the teeth 38a are preferably aligned in a radial direction on the tie bar and separated by a space in the axial direction. Each of the strips of teeth such as strips of teeth 39a is radially separated from another strip of teeth via an outer axially extending slot, such as slots 40a. Outer strips of teeth 39a and slots 40a of tie bar 20a are adapted to engage and align, respectively, with inner teeth and grooves of securing/clamping assembly 22a, discussed below, in order to cause a locking engagement with the bar 20a.

Figure 6A:
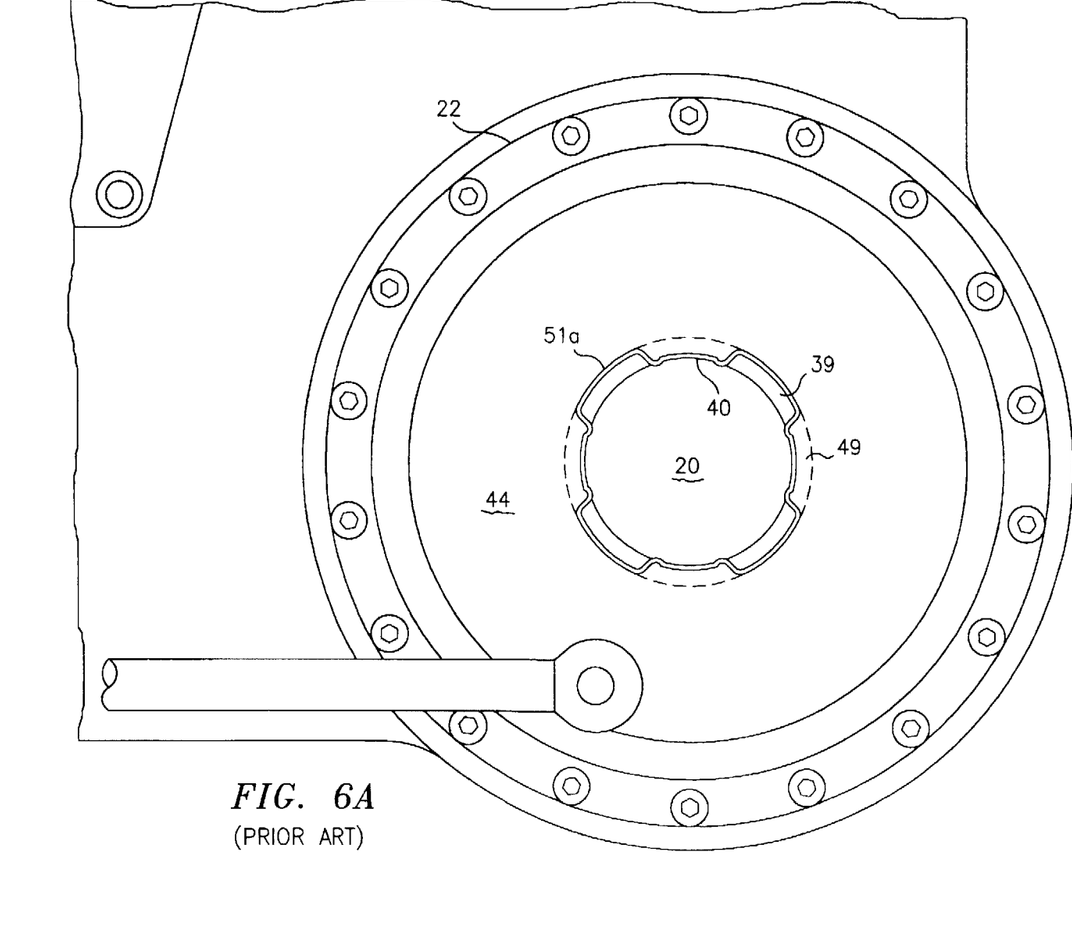
FIG. 6A is an enlarged view of the rotational mechanism shown in FIG. 4 in the disengaged position.

Securing/clamping assembly 22a is positioned in bore 35a and is secured therein via retaining ring 41a and fasteners 42a, as shown in FIG. 3A. Securing/clamping assembly 22a is comprised of a member in the form of a piston 44a adapted to be positioned in bore 35a and coaxially relative to a tie bar 20a, as shown in FIGS. 3A and 3B. Piston 44a includes an outer surface 46a and an inner surface with axially extending teeth 48a separated by spaces in the axial direction, which are adapted to engage teeth 38a of the strips of teeth 39a of tie bars 20a. A slight axial clearance is provided between the teeth 38a of tie bars 20a and the inner teeth 48a of toothed piston 44a to allow for relative movement and position error adjustment during engagement of the teeth. In FIG. 3A, the top half of the figure shows locking engagement of teeth 38a of tie bar 20a with inner teeth 48a of piston 44a, and the clearance, while the bottom half shows non-engagement. Inner teeth 48a are included in a plurality of equally radially spaced and axially extending inner strips of teeth, such as 49a, which are radially separated from each other by inner slots 51a, as shown in FIG. 6A and axially separated by a space.

In order to achieve relative motion between securing/clamping assembly 22a and tie bar 20a, outer strips of teeth 39a of tie bar 20a are less in radial width than inner slots 51a of piston 44a and outer slots 40a of tie bar 20a are greater in radial width than inner strips of teeth 49a of piston 44a, thus allowing sufficient space for axial movement therebetween. During engagement or disengagement of strips of teeth 39a with strips of teeth 49a, teeth 38a do not extend into the spaces between inner teeth 48a or slots 51a, respectively, the entire depth of the spaces or slots thereby leaving a clearance between the teeth and piston bore. A clearance also preferably exists between teeth 48a and the innermost surfaces of tie bar 20, i.e. the surfaces defined by the spaces between teeth 38a or the surface of slots 40a.

Outer surface 46a of piston 44a has a stepped shape preferably including a base portion 50a having a wider diameter than a neck portion 52a. Bore 35a is shaped to closely receive piston 44a at the base and neck portion. Accordingly, bore 35a has a smaller bore portion 54a having a diameter only slightly greater than the diameter of neck portion 52a and larger bore portion 56a having a diameter only slightly greater than the diameter of base portion 50a of piston 44a. Smaller bore portion 54a and larger bore portion 56a are circular in shape and are separated by an intermediate bore portion 58a having a hemispherical, tapered, stepped or other type of shape, the choice of which is not critical. Intermediate bore portion 58a begins at smaller bore portion 54a, expanding outwardly to its maximum diameter just prior to larger bore portion 56a. The maximum diameter of intermediate bore portion 58a is less than the outside diameter of larger bore portion 56a, and base portion 50a of piston 44a. Accordingly, a face 60a is formed between intermediate bore portion 58a and larger bore portion 56a against which axially transverse surface 62a of piston 44a can abut.

Referring still to FIGS. 3A and 3B, seals 64a are provided between smaller bore portion 54a and neck portion 52a and seal 69a is provided between larger bore portion 56a and base portion 50a of piston 44a. Intermediate bore portion 58a is accordingly greater in diameter than the transitional area 59 between base portion 50a and neck portion 52a, defined in part by axially transverse surface 62a, of piston 44a. Accordingly, free space 66a is provided between bore 35a and piston 44a in the vicinity of the intermediate bore portion 58a. This space 66a is appropriately sealed via seals 64a and 69a, for the introduction of pressurized air, hydraulic or other fluid in order to provide a clamping pressure against surface 62a of piston 44a for pressing the movable platen 14 against the fixed center platen 12 during injection molding. Clamping pressure is released by releasing hydraulic pressure from space 66a and applying hydraulic fluid under pressure in cavity 65a against surface 67a of piston 44a. Before pressure is applied in space 66a against surface 62a so as to force movable platen 14 against the fixed center platen 12, inner strips of teeth 49a of piston 44a should first be engaged with outer strips of teeth 39a of tie bar 20a. Such locking engagement, and disengagement, of inner strips 49a with outer strips of teeth 39a is accomplished via rotational mechanism 68, shown in FIG. 4.

Figure 4:
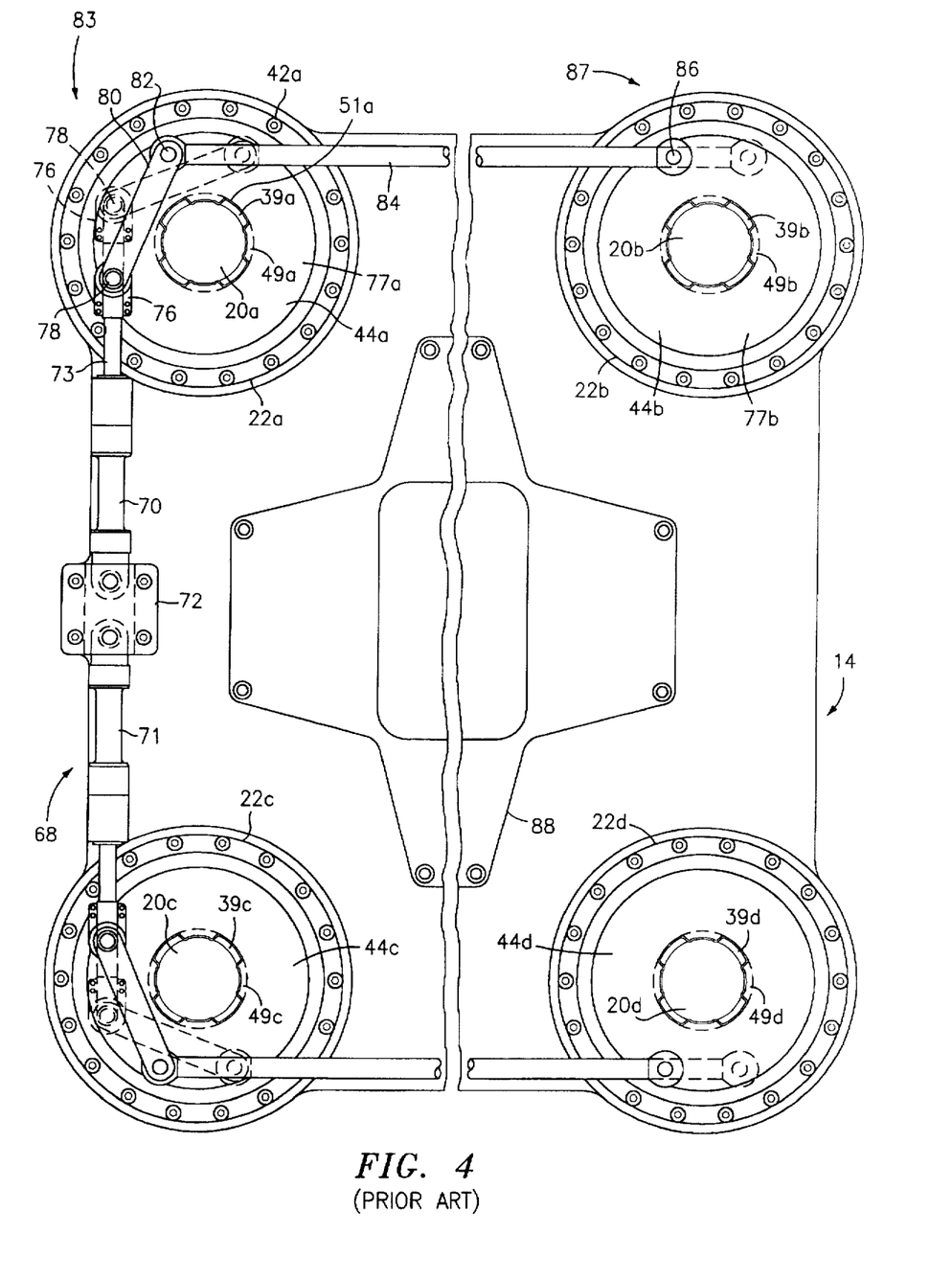
FIG. 4 is an end view of the injection molding machine shown in FIG. 1 for use with the principles of the present invention and showing the securing/clamping assemblies and rotational mechanism therefor.

Rotational mechanism 68 is used for rotating securing/clamping assemblies 22a–22d and is substantially the same as the rotational mechanism (not shown) used with securing/clamping assemblies 23a–23d. Accordingly, only rotational mechanism 68 is described in detail, it being understood that the description applies equally to the rotational mechanism used with securing/clamping assemblies 23a–23d.

As shown in the end view of FIG. 4 where securing/clamping assemblies 22a–22d are shown positioned in movable platen 14, rotational mechanism 68 is preferably in the form of a linkage assembly which extends between and is connected to all four securing/clamping assemblies 22a–22d on the movable end platen 14. Rotational mechanism 68 specifically connects securing/clamping assemblies 22a and 22b and securing/clamping assemblies 22c and 22d. The linkage assembly of rotational mechanism 68 includes one or more, preferably a pair, of piston/cylinder mechanisms 70 and 71 attached to bracket 72 between two of the securing/clamping assemblies, i.e. securing assemblies 22a and 22c.

Both piston/cylinder mechanisms 70 and 71 and associated linkage are substantially the same and accordingly only one piston/cylinder assembly 70 and associated linkage will be described in detail, it being understood that the description applies equally to assembly piston/cylinder assembly 71 wherein assembly 71 is substantially the mirror image of assembly 70.

The non-moving end of piston/cylinder assembly 70 is pivotally attached to bracket 72 and piston rod end 73 of piston/cylinder assembly 70 extends toward securing/clamping assemblies 22a–22b.

Piston rod 73 extends from piston/cylinder assembly 70 and is attached via a bearing assembly 76 to the end 77a of piston 44a. Linkage arm 80 is attached to bearing assembly 76 which pivots about stud 78 fastened to end surface 77a. Linkage arm 80 traverses a portion of end 77a of piston 44a and is connected at another stud 82 on end 77a. Studs 78 and 82 are preferably spaced from each other on the end surface 77a of piston 44a, approximately 90°. Stud 78 is preferably positioned on the outer side 83 of the vertical centerline of securing/clamping assembly 22a. A second linkage arm 84 extends from stud 82 which connects securing/clamping assemblies 22a and 22b and is attached to the end surface 77b of piston 44b. Linkage arm 84 is pivotally attached to securing/clamping assembly 22b at a stud 86, wherein stud 86 is positioned on securing/clamping assembly 22b adjacent the outer side 87 of the vertical centerline of securing/clamping assembly 22b.

Figure 6B:
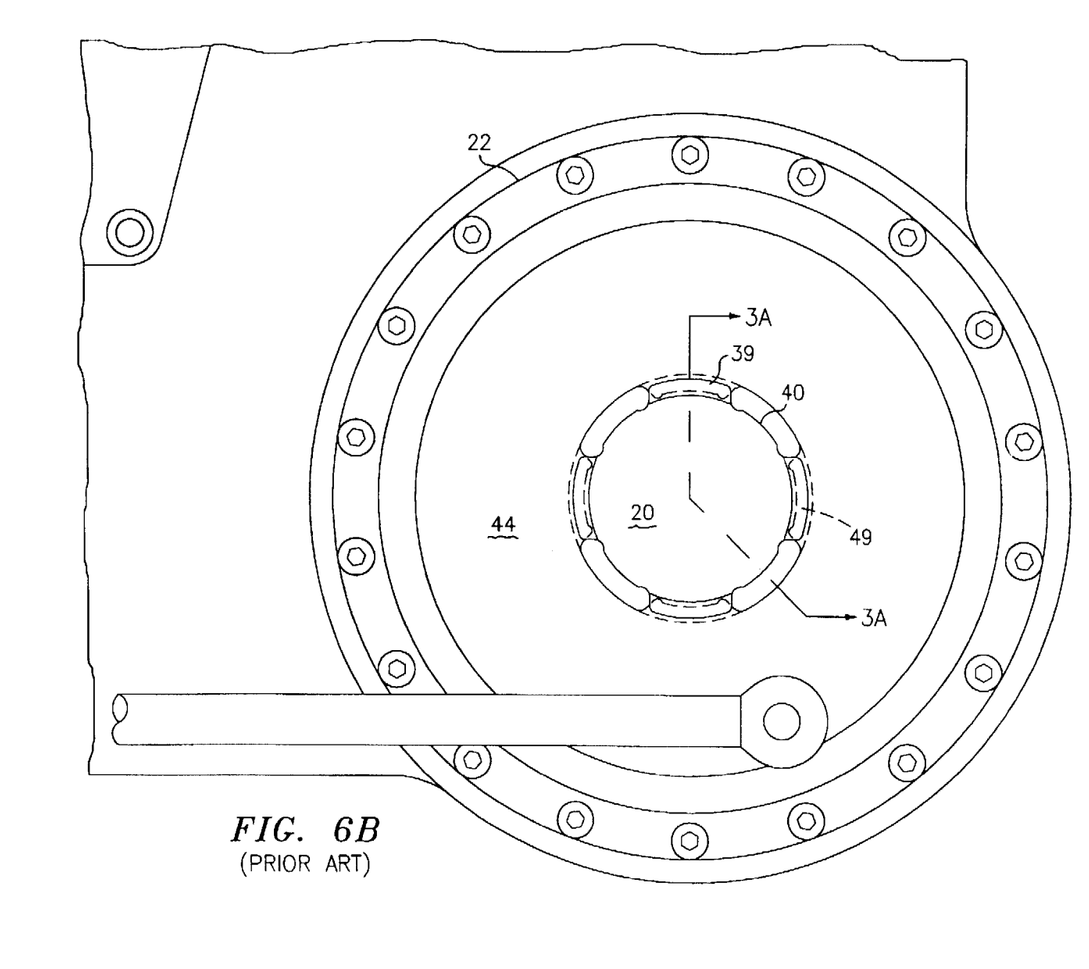
FIG. 6B is an enlarged view of the rotational mechanism shown in FIG. 4 in the engaged position.

The dotted lines in FIG. 4 indicate movement of rotational mechanism 68 upon the actuation of piston/cylinder assemblies 70 and 71. The solid lines show the pistons in the unextended position with the inner strips of teeth 49a–49d of the pistons 44a–44d being unengaged with outer strips of teeth 39a–39d of tie bars 20a–20d. The dotted lines of the securing/clamping assemblies also show the inner strips of teeth 49a–49d of pistons 44a–44d engaged with the outer strips of teeth 39a–39d of tie bars 20a–20d. This engagement and disengagement is shown in more detail in FIGS. 6A and 6B, where FIG. 6A shows the securing/clamping assembly 22d in the disengaged position, i.e. strips of teeth 39d and 49d enmeshed and FIG. 6B shows the securing/clamping assembly 22d in the engaged position with strips teeth 39d and 49d meshed. Accordingly, upon simultaneous actuation of piston/cylinder assemblies 70 and 71, inner strips of teeth 49a–49d, securing/clamping assemblies 22a–22d, respectively, can be synchronously engaged and disengaged with outer strips of teeth 39a–39d of tie bars 22a–22d, respectively, so as to lock movable platens 14 and 16 into substantially closed positions prior to the application of the desired clamping force via pressure against surfaces 62a–62d (62b–62d not shown) of pistons 44a–44d (44b–44d not shown), as shown in FIG. 3A.

The total available travel of piston 44 is at least the total of the pitch of the strips of teeth plus the clearance plus the maximum elongation of the tie bars. This allows shut height to be adjusted to any point between maximum and minimum even though engagement between tie bar teeth and piston teeth is of a fixed pitch.

While the rotational mechanism 68 has been described in detail as a linkage assembly, it is to be understood that other types of rotational mechanisms can be used such as, for example, sprockets, belts and chains, directly synchronized drives, and rack and pinion assemblies.

While the securing/clamping assemblies 22 of the present invention have been described for use with a tandem injection molding machine having a fixed center platen and two movable end platens, the securing/clamping assemblies are by no means limited to such use. Assemblies 22 can be incorporated in a manner similar to as described above for tandem type machines having a fixed end platen and movable platens movable toward the fixed end platen. Use of the securing/clamping assemblies is also feasible and contemplated for other variations of tandem machines.

Figure 5:
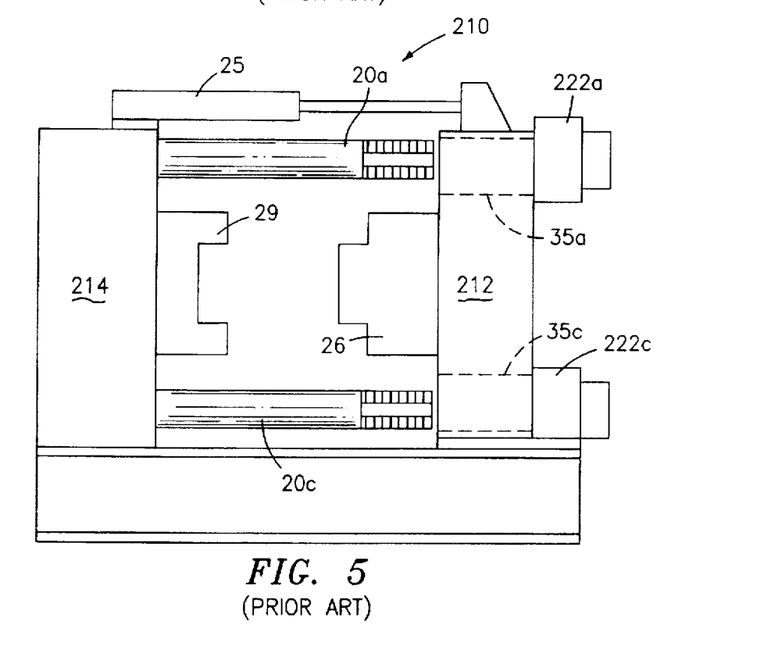
FIG. 5 is an elevational view of a single mold injection molding machine which may also be used with the principles of the present invention.

Further, the securing/clamping assemblies can be equally used with a non-tandem machines 210, as shown in FIG. 5, i.e. injection molding machines having a single stationary mold platen 214 and one movable platen 212 or any other variation thereof. Accordingly, FIG. 5 is indicative of the use of the securing/clamping assemblies 22, therein assemblies 222a and 222c, of the present invention with a non-tandem machine 210. The above description of the securing/clamping assemblies, rotational mechanisms, and the additional parts of the injection molding machine, are equally applicable to a non-tandem machine and is incorporated herein. Alternatively, assemblies 222a and 222c can be mounted on fixed platen 214 and tie bars attached to moving platen 212.

Figure 7:
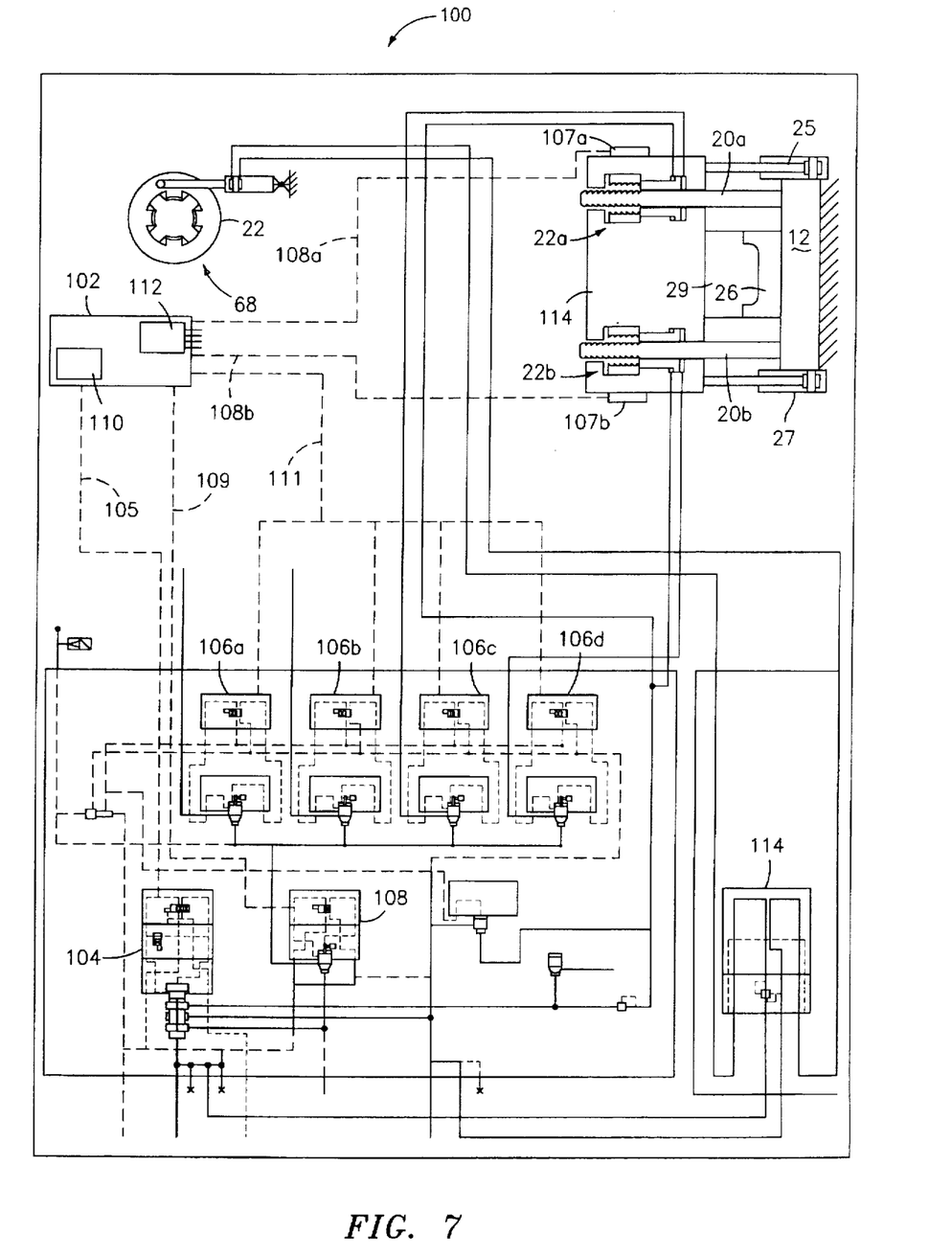
FIG. 7 is a schematic diagram of a control circuit system which is operational to control the clamp-up and mold break activities of the injection molding machine of FIGS. 1–6B, as well as resetting the positions of the securing/clamping assemblies in accordance with the principles of the present invention.

Referring now to FIG. 7, the control system 100 of the present invention is shown schematically. Control system 100 is operative to individually control each of securing/clamping assemblies 22a–22d (22c and 22d not shown). Control system 100 generally includes a controller 102, a four way servo valve 104, preferably a high dynamic servo valve, used to control axial motions of all four securing/clamping assemblies, cartridge valves 106a–106d used for enabling or disabling the movements of each of the securing/clamping assemblies 22a–22d (22c and 22d not shown), a plurality of linear position measuring devices 107a–107d (107c and 107d not shown), preferably linear transducers for measuring the position of the securing/clamping assemblies, a pressure transducer for measuring the pressure of the clamping assemblies, a lock out valve 108 to facilitate the segregation of the hydraulic supply from the clamping assemblies for preventing clamp pistons' movements and maintaining the clamp force, when the same is reached, a closed loop controller 110 for controlling clamp-up tonnage, monitoring logic 112 for use with linear position measuring devices 107a–107d (107c and 107d not shown) for measuring the positions of securing/clamping assemblies 22a–22d (22c and 22d not shown), and a securing/clamping assembly control manifold 114 for rotating the securing/clamping assemblies into engagement with the tie bars. Controller 102 (shown schematically) is operative with these elements and other elements disclosed below to provide a system and process for intricately controlling the movements of securing/clamping assemblies 22a–22d (22c and 22d not shown).

Controller 102 (shown schematically) is operable to coordinate the operations of the various valves and other elements in control system 100. Cartridge valves 106a–106d for each of securing/clamping assemblies 22a–22d (22c and 22d not shown), respectively function to enable each of securing/clamping assemblies 22a–22d to provide a clamp-up force to mold halves 30 and 31. Cartridge valves 106a–106d provide enablement status to securing/clamping assemblies 22a–22d (22c and 22d not shown) when it is verified that the securing/clamping assemblies are in engagement with tie bars 20a–20d (20c and 20d not shown), respectively. Sensors (not shown) are used to verify such engagement of securing/clamping assemblies with the tie bars. Engagement of securing/clamping assemblies 22a–22d (22c and 22d not shown) with the tie bars is established via securing/clamping assembly control manifold 114 which provides pressurized fluid to rotational mechanism 68, rotating securing/clamping assemblies 22a–22d (22c and 22d not shown) into engagement with the tie bars. Under the control of controller 102, manifold 114 is activated when home position is reached as discussed further below. Once enabled, the status of the enabled condition is confirmed by limit switches (not shown) installed in the four cartridge valves 106a–106d. An open status for each of the cartridge valves form an interlock condition for clamping-up. A loss of this status detected by controller 102 constitutes a fault condition and the clamp-up action will be terminated and securing/clamping assemblies 22a–22d (22c and 22d not shown) vented to tank.

Servo valve 104 is operative to provide a preset flow rate of hydraulic fluid or the like to the securing/clamping assemblies when controller 102 verifies that cartridge valves 106a–106d have enabled each of securing/clamping assemblies 22a–22d (22c and 22d not shown). Closed loop controller 110 (shown schematically) is provided for regulating the rate of increase of hydraulic fluid provided by servo valve 104, and accordingly, the rate of increase of clamping force. Closed loop controller 110 provides control to the system for rapid build up of clamp-up tonnage until the tonnage meets a required set point. Closed loop controller 110 also prevents clamp-up tonnage from exceeding the prescribed set point.

Controller 102 also includes additional monitoring logic 112 (shown schematically) which prevents the securing/clamping assemblies from experiencing the build up of unequal clamping forces relative to each other. Such an inequality could cause mechanical damages. The linear position measuring devices 107a–107d (107c and 107d not shown), such as linear transducers, are used in conjunction with monitoring logic 112 to measure the positions of each of securing/clamping assemblies 22a–22d (22c and 22d not shown) at all times and are positioned adjacent securing/clamping assemblies 22a–22d, as shown. Controller 102 is provided with a prescribed maximum allowable deviation in position and accordingly, the measurements from linear position measuring transducers 107a–107d (107c and 107d not shown) are used to maintain each of the securing/clamping assemblies within the prescribed deviation. Should the maximum deviation measured by the transducers exceed the maximum allowable value, the clamp-up process will be terminated and the securing/clamping assemblies vented to tank.

The prescribed level of the clamp-up tonnage can be continuously regulated by servo valve 104 under closed loop pressure control or can be maintained by lock out valve 108 to prevent deviation of the clamp-up tonnage from the prescribed level until the molding process is completed.

Referring now to FIGS. 1–8 the operation of the injection molding machine 10 in accordance with the principles of the present invention will be described. For the sake of simplicity, multiple securing/clamping assemblies and associated elements and multiple tie bars and associated elements will be referred to by number designation only and not the letter designations, unless otherwise noted.

Figure 8A:
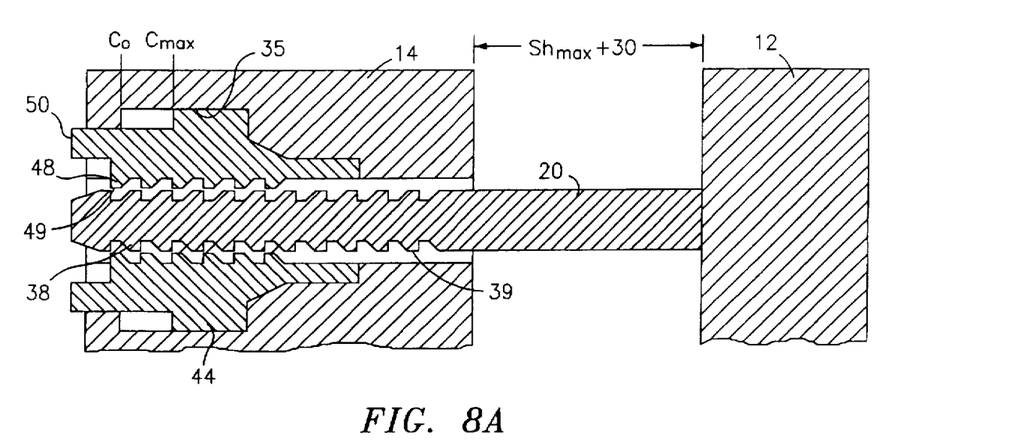
FIG. 8A is a partial schematic view of the movable platen, securing/clamping assembly and stationary platen identifying the positions of these elements used in calculations by a controller, and in accordance with the principles of the present invention.
Figure 8B:
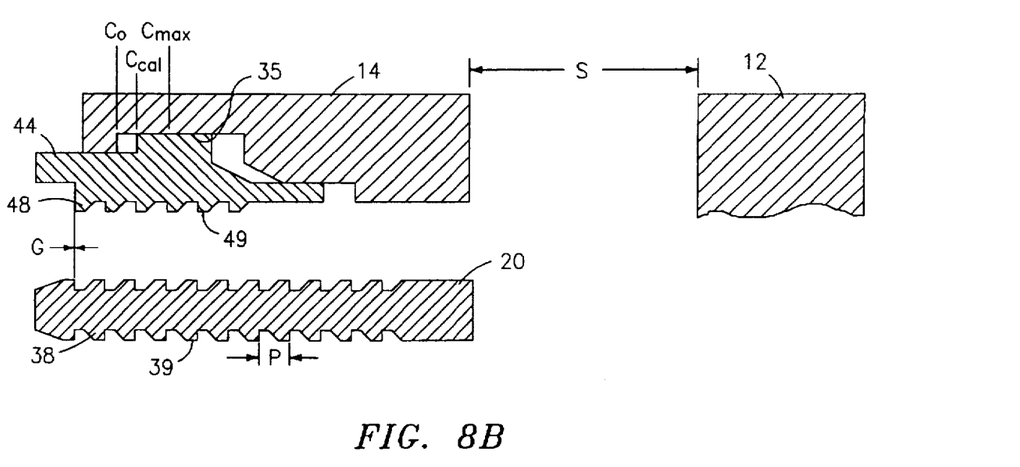
FIG. 8B is a partial schematic view of the movable platen, securing/clamping assembly and stationary platen identifying position variables used in calculating an adjustable starting position in accordance with the principles of the present invention.

In operation, with specific reference to FIGS. 6, 8A and 8B, of tandem machine 10 shown in FIGS. 1 and 2, rotational mechanism 68 for at least one of movable platen 14 and 16, as shown in FIG. 4, is set such that the plurality of securing/clamping assemblies 22 and 23, respectively, are unengaged with tie bars 20 and 21, respectively, i.e. wherein the slots of the tie bars and securing/clamping assemblies are in alignment with the teeth of the securing/clamping assemblies and tie bars, respectively, thus allowing movement of one of movable platens 14 and 16 relative the tie bars and center fixed platen 12, as shown in FIG. 6A. By way of example only, movable platen 14 is first moved into the mold closed position, as shown in FIG. 2, while movable platen 16 remains in a mold open position, as also shown in FIG. 2. In achieving the mold closed position of the mold halves 26 and 29, as shown in FIG. 2, movable mold half 29 is moved via positioning cylinder 25 into engagement with first stationary mold half 26. In addition, injection unit 18 is locked in engagement with locking flange 36 of first hot runner 32, as shown by the dotted lines of FIG. 1 or alternatively, a distribution valve is directed to mold halves 26 and 29. Accordingly, during movement of movable end platen 14, rotational mechanism 68 for movable platen 14 is in the position as shown by the solid lines in FIG. 4 and securing/clamping assemblies 22 are movable relative to tie bars 20.

When first stationary mold half 26 and first movable mold half 29 are in the position shown in FIGS. 1 and 2, under the control of control system 100 and specifically controller 102, and through the application of rotational securing/clamping assembly control manifold 114, rotational mechanism 68 is actuated via piston/cylinder assembly 70 and 71 such that the inner strips of teeth 49 of pistons 44 are rotated into engagement with outer strips of teeth 39 of tie bars 20. The actuation of rotation mechanism 68 is performed only when all securing/clamping assemblies 22 are positioned to their home positions.

Due to thermal effects, such as expansion, on the platens and body of the injection molding machine during molding, the optimal starting or home position of the securing/clamping assemblies can change and accordingly is redetermined after every molding cycle, as described below.

Home or adjustable starting position can be defined with reference to FIGS. 8A and 8B. Each piston 44 has a zero position denoted as $C_0$ which defines the pistons position fully retracted and in the clamp-up direction. Each piston also has a fully extended, unclamped position defined as maximum position $C_{max}$, the value of which also defines the mechanical stroke of piston 44. When one of moving platens 14 and 16 is positioned by cylinders 25 and 27 (shown in FIG. 7), respectively, the movable platens preferably have a clearance from the stationary platen equal to the maximum shut height for the mold being used, plus an offset, which may preferably be 30 mm. At this position, and when the piston is fully extended to its maximum position $C_{max}$, the ends of tie bars 20 are preferably flush with the outside surface of base portion 50 of piston 44. In calculating the home or starting position of piston 44, in addition to $C_0$ and $C_{max}$, several other variables are used.

As shown in FIG. 8B, $C_{cal}$ defines the home position of the stroke piston 44 at maximum shut height. By virtue of the mechanical design, $C_{cal}$ can be defined as $C_{max}$–offset, preferably 30 mm, so that at this position when the moving platen is at maximum shut height, the piston has enough stroke to provide clamp-up and maximum mold break, as well as sufficient securing/clamping assembly clearances. Securing/clamping assembly clearance G, defined as the clearance between inner teeth 48 and the teeth 38 of the piston 44 and tie bar 20, respectively, is also used in determining the home position of the clamp piston at different shut heights. P defines the pitch of the teeth of piston 44 and tie bar 20. $C_{min}$ defines a minimum clamp-up stroke based on stretching of tie bars at the prescribed tonnage. $C_{cushion}$ defines a cushion distance provided such that the piston 44 does not bottom out against the walls of bore 35 when clamp-up is performed. The following table lists the mechanical dimensions of the parameters discussed above for particular smaller and larger clamping units.

| Parameter | E900–E1650 | E2150–E3650 |
| --- | --- | --- |
| Maximum clamp piston stroke $C_{max}$ | 60 mm | 75 mm |
| Clamp piston calibration position $C_{cal}$ | $C_{max}$-offset | $C_{max}$-offset |
| Gap on one side of a tooth G | 1.5 mm | 2 mm |
| Tooth pitch P | 32 mm | 40 mm |
| Minimum clamp-up stroke $C_{min}$ | 3 mm | 4 mm |
| Clamp-up cushion $C_{cushion}$ | 2 mm | 2 mm |
| Maximum mold break stroke $Mbr_{max}$ | 20 mm | 25 mm |

Controller 102 uses the above discussed variables in calculating the starting or home position $C_{home}$ of each securing/clamping mechanism via computer program product having computer readable code. Controller 102 preferably uses the following formulas provided in the code for calculating the home or adjustable starting position, which position allows for sufficient and optimum stroke for clamp-up and mold break. The formulas are as follows:

Algorithm 1

$$C_{home}=[C_{cal}-(Sh_{max}-Sh_{actual})]\text{modulus } P$$

If $C_{home}<a$, then $C_{home}=C_{home}+P$, where $a=C_{cushion}+C_{min}+G$, and where (X) modulus P is operative to return the remainder after X is divided by P.

For the above calculations used by controller 102, the actual shut height $Sh_{actual}$ is directly measured from the machine when mold halves 26 and 29 are closed. In accordance with the above formulas used by controller 102, the securing/clamping assemblies are positioned to their optimum home positions on the tie bars so that the required mold break stroke and clamp-up stroke is provided.

In addition, the above formulas can be used together with the following formulas to provide that a minimum volume is kept in the chambers of the securing/clamping mechanisms 22 so that clamp-up time and stiffness of the securing/clamping mechanisms are minimized when the maximum mold break stroke is not required. The formulas are as follows:

Algorithm 2

If $C_{max}-C_{home}-G \geq Mbr_{setpoint}+P$, then $C_{home}=C_{home}+P$

To recover from situations when the securing/clamping assemblies 22a–22d are not rotated fully out, without any possible damages to the mechanical assemblies due to movement without complete clearance, the following algorithms are used to provide design parameters which minimize possible damages to the mechanical assemblies disclosed herein. Considering the mechanical design of the system, complete securing/clamping assembly clearance is always fulfilled if the following relationship is satisfied wherein:

$C_{target}$=Securing/clamping assembly clearance position
$Sh_{actual}$=Actual mold position (Actual shut height)
$C_{act}$=Clamp cylinder actual position
$Sh_{max}$=Position of stroke at maximum mold shut height
n=integer (0, 1, ... )

$$(Sh_{max}-C_{cal})-(Sh_x-C_{target})=n\times P$$

The problem is reduced to find a $C_{target}$ which is at the smallest distance from the $C_{act}$. Hence, the algorithm is as follows:

Algorithm 3

$$X=[(Sh_{max}-Sh_x)-(C_{cal}-C_{act})]\text{Modulus } P$$

If $X>(P-X)$, then $X=(X-P)$ $C_{target}=C_{act}-X$

The above algorithm applies for calculating the securing/clamping assembly clearance, while algorithms 1 and 2 applies to the calculation of the home position. The reason for not using the home position calculation algorithms for securing/clamping assembly clearance is because algorithm 3 does not take into account the mold break stroke.

In the event of the loss of "securing/clamping assembly engaged" status and "securing/clamping assembly disengaged" status, the actual clamp piston position $C_{act}$ is compared to the target, $C_{target}$ for securing/clamping assembly clearance. If the absolute difference is smaller than or equal to G then the controller will move the clamp pistons to the securing/clamping assembly clearance target position before rotating the securing/clamping assembly to a disengaged position. However, if the absolute difference is calculated more than G, securing/clamping assemblies will be rotated out without any clamp piston movement. The later situation implies the possible contact of the teeth of the securing/clamping assemblies and tie-bars. This control scheme will be applied when mold close or mold open is initiated during manual operation. The strategy is adopted to get out from deadlock situation and minimize mechanical damages to the machine.

To provide more efficient operation during automatic cycling, the securing/clamping assembly clearance is re-gained after mold break by stroking the mold stroke cylinder by a small distance G in the opening direction. Since the clamp pistons are in contact with the tie-bars at the end of mold break operation, the opening of the moving platen by a stroke of G will provide the necessary securing/ clamping assembly clearance. Re-positioning of the clamp pistons to home position will be carried out after securing/ clamping assemblies are rotated to a disengaged position.

The initial position of the mold halves is achieved by moving the movable platen in a stepwise manner until strips of teeth 39 and 49 are in position for engagement. Rotational mechanism 68 under the direction of manifold 114 rotates securing/clamping assemblies 22 into engagement with the tie bars 20. The engaged position of the securing/clamping assemblies 22 is represented by the dotted line shown in FIG. 4. Such engagement of outer strips of teeth 39 of tie bar 20 with inner strips of teeth 49 of pistons 44 is also shown in the upper half of FIG. 3A and in FIG. 6B.

With the inner strips of teeth 49 engaged with outer strips of teeth 39 and the first stationary mold half 26 being positioned in molding engagement with first movable mold half 29 (as shown in FIG. 1), pressure can be applied to the mold halves via securing/clamping mechanisms 22 through servo valve 104. Accordingly, each of cartridge valves 106a–106d are actuated to enable clamping motion by pistons 44 of securing/clamping assemblies 22. Once enablement is detected by controller 102 through limit switches (not shown) installed in cartridge valves 106a–106d, servo valve 104 is operative to provide pressurized fluid to securing/clamping assemblies 22. If however, the enablement status of the cartridges is detected by controller 102 as disabled, a fault condition, clamping action by the enabled securing/clamping assembly 22 is terminated and assemblies 22 are vented to tank. Disablement occurs when the securing/clamping assembly 22 reaches the home position or when the linear position of assemblies 22 deviate too far from a mean value, as discussed below in detail.

If no fault condition is detected, and referring again to FIG. 3A, hydraulic pressure or the like is provided via servo valve 104 at a preset flow rate against longitudinal transverse surface 62 of each securing/clamping assembly 22. The hydraulic pressure against surface 62 forces first stationary mold half 26 and first movable mold half 29 sealably together in preparation for injection molding and moves piston 44 through the stroke calculated between the home or starting position $C_{home}$ and the required clamp-up position, as shown in FIGS. 8A and 8B. In addition, any clearances between the respective teeth of the clamp pistons 44 and tie bars 20 are taken up during the stroke. Through servo valve 104 under the command of controller 110, clamp-up force builds between the mold halves. That is, the rate of increase of clamp-up force is regulated by servo valve 104 under the supervision of closed loop controller 110. The pressure build up is, therefore, maintained at a preset level through closed loop controller 110. As force between the mold halves is maintained via each securing/clamping assembly 22, and at the proper level via closed loop controller 110, melt is injected via injection unit 18 through first hot runner 32 for facilitating molding.

During any simultaneous motions of the four clamp pistons, it is essential to have all clamp pistons moving synchronously. For this reason, the synchronous operation is monitored by a function, called synchronization monitor 112, shown in FIG. 7. The function is started when the clamp pressure is measured to exceed a minimum threshold value during simultaneous motions of all four pistons. At the start of the monitoring logic, the actual positions of all clamp pistons are read in as starting positions. At each sampling time of the function, the change in position with respect to the starting position of each piston is calculated and the mean value of the change is compared to the change in position of the piston. During clamp-up, the positions of all four pistons 44 are measured at all times through linear transducers 107a–107d in conjunction with monitoring logic 112, shown in FIG. 7. Under the guidance of controller 102, these positions are only allowed to deviate from a mean value preferably set at 0.5 mm. Should any deviation of any piston exceed this maximum allowable mean value, the clamp-up motion is aborted by controller 102 and all securing/clamping assemblies 22 are vented to tank.

Referring to FIG. 7, during clamp-up, once the clamp-up tonnage is reached, lock out valve 108 maintains the desired clamp-up force at the required tonnage until injection molding is complete and cooling time has expired. After cooling, lock out valve 108 is de-energized via controller 102 via line 109 and all cartridge valves 106 are open via line 111 to allow clamp-up pressure to decompress to a low level for unclamping. Therefore, pressure is reduced in cavities 66 for the unclamping of the molds. For smooth decompression and unclamping without any hydraulic shocks, decompression is preferably performed following an S-curve time ramp. Similar to clamp-up, during decompression, the positions of the pistons 44 may be are synchronized through monitoring by linear transducers 107 and logic 112, as controlled by controller 102.

After decompression, securing/clamping assemblies 22 are used to break the mold. Pistons 44 are maintained in engagement with tie bars 20 and securing/clamping assemblies are powered in the backward direction by pressurized fluid through servo valve 104 and against surfaces 67 of pistons 44, as shown in FIG. 3A. Accordingly, flow control through servo valve 104 for unclamping is substantially similar to flow control via servo valve 104 during clamp-up, except that fluid is directed in the opposite directions. During the entire operation of breaking the molds, monitoring logic 112 is used to ensure synchronized movement between all securing/clamping assemblies 22.

Once mold break is completed, the teeth of pistons 44 are rotated out of engagement with the teeth of tie bars 20 via rotational mechanism 68 controlled by securing/clamping assembly control manifold 114. Once this disengagement of the teeth has been accomplished, positioning cylinder 25 is operable to move first movable mold half 29 away from first stationary mold half 26 so that the molded unit may be ejected by the ejection system 88, shown schematically in FIG. 1, the design of which is known in the art. In preparation for the subsequent clamping sequence, pistons 44 are required to be repositioned to the home or starting position.

Repositioning may take place as long as pistons 44 are disengaged from tie bars 20. Repositioning may begin even if mold opening is not complete. Semi-simultaneous repositioning or sequential repositioning may be used for repositioning pistons 44.

For semi-simultaneous repositioning, and with reference to FIGS. 3A, 7, 8A and 8B, the process is divisible into two parts which includes coarse control and fine control. To begin the coarse control, cartridge valves 106a–106d enable all pistons 44 to be moved toward their home or adjustable starting positions via servo valve 104 directing pressurized fluid to the pistons. An outer window or threshold value is defined which is at close proximity to the target but which is defined by a distance long enough to prevent overshoot of the clamp pistons. When each clamp piston 44 reaches its outer window or threshold value, a decision logic is used to determine whether it should be transited to fine control or be stopped at the outer window. The decision is based on whether any other clamp piston 44 is enabled. If all other pistons 44 are disabled, clamp piston 44 will transit to fine control when the outer window is reached. Otherwise, if at least one other piston 44 is enabled it is disabled when the outer window is reached. In this way, continuity of motion of at least one clamp piston 44 is preserved. If the clamp pistons are on different sides of the target position when semi-simultaneous repositioning is started, only the clamp pistons of one side are moved towards the target position. When all pistons on the same side are repositioned then the remaining pistons on the other side will commence the repositioning.

In accordance with the above calculations, controller 102 has calculated the home or adjustable starting position and linear transducers 107a and 107b along with monitoring logic 112 via lines 108a and 108b continually calculate a distance each piston 44 has to move for reaching the home or adjustable starting position, as determined from the calculation discussed above. As discussed above, controller 102 is provided with an outer window or threshold value which defines a set distance the pistons 44 have to move to the home or starting position. When one piston 44 has reached a position in which the distance to the home or starting position in less than the threshold position value, and all other pistons are disabled controller 102 switches closed loop controller 110 to fine control.

During fine control, closed loop controller 110 functions to reduce the flow setting of servo valve 104 preferably to a quarter of its coarse control setting to insure a smooth continuous movement of the leading clamp piston. When the leading clamp piston 44 has reached its home or adjustable starting position, it is disabled via cartridge valve 106, thereby preventing any further movement of that first piston. After the first piston 44, another piston of the remaining yet to be positioned pistons is enabled and selected for fine control. A number of selection criteria could be used. For example, selection can be based on which piston is closer to the home or adjustable starting position. Once selected, the another piston 44 is enabled through cartridge valve 106 and positioned to its home or starting position via pressurized fluid through servo valve 104, finely controlled by controller 110. This process continues for all the pistons 44 until all pistons 44 are positioned at their home or starting position.

For sequential repositioning, a strategy similar to the semi-simultaneous approach described above is used, except that all securing/clamping assemblies 22 are repositioned one after another, sequentially. That is, each assembly is controlled as described above but sequentially such that coarse and fine control is performed entirely on each assembly, one after another.

For the tandem machine 10 as shown in FIG. 1, as securing/clamping assemblies 22 are released and movable mold half 29 is moved to the open position, the other movable mold half 31 is closed via cylinder 27, and clamped via securing/clamping assemblies 23, via the same operation as discussed above for mold halves 26 and 29 and securing/ assemblies 22 under the control of controllers 102 and 110. Injection unit 18 is moved into locking engagement with locking clamps 36 of second hot runner 34, or valve direction is changed for injecting melt and forming a molded unit in mold halves 30 and 31. The securing/clamping assemblies 23 are designed and function in the same manner as described above and are repositioned in the same manner as described above.

Mold halves 26, 29 and 30, 31 can be opened, closed, clamped and unclamped independently of each other. Each side of stationary platen 12 can be operated as a completely independent machine or they can be coordinated and synchronized in any one of a number of ways.

FIG. 5 shows a single mold injection molding machine 210 having stationary platen 214 and one movable platen 212. Injection molding machine 210 includes securing/ clamping assemblies 222, similar to as described above for the tandem machine, in movable platen 212 and is designed and functions the same as described above with regard to securing/clamping assemblies 22, tie bars 20 and rotating mechanism 68, except that only one set of securing/ clamping assemblies, tie bars, and one rotating mechanism is used.

An additional feature of the present invention is with regard to mold protection sensitivity. Mold protection sensitivity is defined as the capability of the machine to detect parts trapped between the two mold halves. This is calculated as the difference between the shut height measured at the loss of low tonnage level during decompression after clamp up of the previous machine cycle and the shut height measured at the "securing/clamping assembly engaged" status of the current cycle, wherein "securing/clamping assembly engaged" status implies the engagement of securing/clamping assemblies 22 with tie bars 20. Securing/ clamping assemblies are allowed to go to "engaged" status when the clamp pistons are within a window of small distance from the target position and the shut height is within a window of small distance from the mold closed position. In the event that the mold closed position (a small window from shut height position at the last decompression) cannot be reached within a time period, which is measured after the stroke has reached a fixed distance from the mold closed position, the securing/clamping assemblies will be rotated to a disengaged position and the mold will be opened automatically with a "Part Interference" alarm.

When securing/clamping assemblies are moving to "engaged" status, mold closing is still active. Since securing/ clamping assemblies motion requires time to complete, at end of "securing/clamping assembly engaged" status, the stroke should have reached the minimum closed position powered by the stroke force. This position of the shut height will be used for calculating the home target of the clamp pistons at next cycle, only if mold protection sensitivity prescribed set value is satisfied. After "securing/clamping assemblies engaged" status is completed, the actual shut height position is compared to the position measured during the decompression of the previous cycle. A message, "loss of mold protection sensitivity" will come up if the prescribed sensitivity value is not made after securing/clamping assembly 22 is rotated in. Consistent occurrences of "Part Interference" and "Loss of Mold Protection Sensitivity" alarms, require operator's attention to inspect the mold cleanliness or parallelism and a new shut height calibration may be required. The strategy is only applied to automatic cycling. For manual mode, it is the operator's responsibility to check for part interference.

The primary advantage of this invention is that a control system is provided for controlling tie bar clamping mechanisms used with injection molding machines. Another advantage of this invention is that a control system is provided for use with tie bar clamping mechanisms for injection molding machine, which mechanisms function to engage tie bars, provide clamp-up forces and also to provide mold break forces. Still another advantage of this invention is that a control system and process is provided which is operative with tie bar clamping mechanisms for placing the same in the proper starting position after each molding operation so as to consistently allow for sufficient stroke for mold clamp-up and mold break. Yet another object of this invention is that a control system and process is provided which is operative with tie bar clamping mechanisms for adjusting starting positions of the mechanisms for accommodating different size molds and respective shut heights.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A process for controlling mold clamping of a molding machine having a movable mold half positioned on a movable platen and a fixed mold half positioned on a fixed platen, comprising the steps of:

provising means for moving said movable platen relative to said fixed platen;

attaching said platens together by connecting means;

exerting and sustaining a force clamping said platens together by a clamping means, and exerting an opposite force for separating said platens by said clamping means, and releasably connecting said clamping means to said connecting means at an adjustable starting position;

actuating said means for moving to close the mold halves;

determining said adjustable starting position of said clamping means, wherein at the said adjustable starting position sufficient stroke is provided for exerting said force for clamping and separating said platens, wherein said step of determining a starting position comprises the steps of measuring actual shut height of said platens in the said mold closed position, measuring actual position of said clamping means, and calculating said adjustable starting position from said measurements;

checking the position of said clamping means to determine if said sufficient stroke of said clamping means is present;

adjusting said adjustable starting position based on the checked position of the clamping means so as to obtain said sufficient stroke of the clamping means after said step of checking;

sustaining said clamping force for a predetermined time;

actuating said clamping means for developing said force for separating; and actuating said moving means to separate said mold halves.

2. The process according to claim 1, wherein said step of checking comprises the steps of:

remeasuring said maximum and actual shut heights of said fixed and movable platen after each clamp-up; and recalculating said adjustable starting position using said relationship and repeating said step of determining.

3. The process according to claim 1, further comprising the steps of disabling and enabling clamp-up by said clamping means and confirming the status of said clamping means as one of enabled and disabled, wherein said status defines at least one condition to be detected before said step of actuating.

4. The process according to claim 3, wherein if the step of confirming indicates a disabled status, further comprising the step of terminating clamp-up by said clamping means.

5. The process according to claim 3, further comprising the steps of using valves for said steps of disabling and enabling.

6. The process according to claim 1, wherein said step of actuating includes actuating said clamping means by pressurized fluid, wherein said step of actuating is accomplished using a multi-directional valve for directing said fluid to each of said clamping means.

7. The process according to claim 6, wherein said step of regulating includes implementing a closed loop pressure controller for controlling the rate of increase of clamping force by controlling the opening of said multi-directional valve.

8. The process according to claim 7, wherein said step of monitoring and controlling includes using said closed loop controller for determining a maximum allowable deviation in relative positioning of a plurality of said clamping means and terminating the clamping process if said maximum allowable deviation is exceeded.

9. The process according to claim 1, including the step of maintaining said clamping force at a prescribed level, and wherein said step of maintaining includes using a lockout valve operative to maintain said clamping force.

10. The process according to claim 1, further comprising the steps of rotating said clamping means into engagement with said connecting means and determining angular position of said clamping means for proper alignment with said connecting means.

11. The system according to claim 10, wherein said step of determining angular position comprises using proximity switches for detecting a prescribed angular orientation.

12. The process according to claim 1, further including the steps of:

de-energizing said clamping means through ceasing said step of maintaining; and decompressing said clamping means for unclamping.

13. The process according to claim 1, further comprising the step of breaking apart said mold halves via said clamping means.

14. The process according to claim 2, further comprising the step of repositioning said clamping means.

15. The process according to claim 14, wherein said step of repositioning includes the steps of:

rotating said clamping means out of engagement with said connecting means;

determining angular position of said clamping means; and moving said clamping means to said adjustable starting position.

16. The process according to claim 15, wherein said step of moving includes:

coarsely moving said clamping means over a distance toward said adjustable starting position to a threshold position; and finely moving a one of said clamping means toward said adjustable starting position from said threshold position.

17. The process according to claim 16, wherein said step of moving further includes:

monitoring the distance of said clamping means from said adjustable starting position;

discontinuing movement of each clamping means which reaches said threshold position when another one of said clamping means is coarsely moving; and continuing movement of at least one clamping means via said step of finely moving when all other clamping means have stopped via said step of discontinuing.

18. The process according to claim 15, wherein said step of moving includes:

coarsely moving only a first one of said clamping means over a distance toward said adjustable starting position until a threshold position is reached; and finely moving said first one of said clamping means from said threshold position to said adjustable starting position.

19. The process according to claim 18, wherein said step of moving further includes:

disabling all other clamping means while said first one of said clamping means is coarsely and finely moved.

20. The process according to claim 19, wherein said step of moving includes:

enabling one of said all other clamping means when said first one of said clamping means has reached said adjustable starting position; and repeating said steps of coarsely and finely moving for said one of said all other clamping means.

21. The process according to claim 20, wherein said step of moving further includes repeating said steps of enabling and repeating for all remaining clamping means.

22. The process according to claim 1, further comprising controlling the rate of increase in said clamp-up force.

23. The process according to claim 1, further including the step of detecting molded parts trapped in said mold halves.

24. The process according to claim 23, wherein said steps of detecting comprises the step of:

comparing shut-heights of previous and current cycles and determining a representative value, said value potentially indicative of a trapped part; and actuating an indicator if said representative value fails to meet a predetermined acceptable value, thereby indicating a possible trapped part.

25. The process of claim 1, including the step of monitoring and controlling the position of said clamping means.

* * * * *